Figure 1:
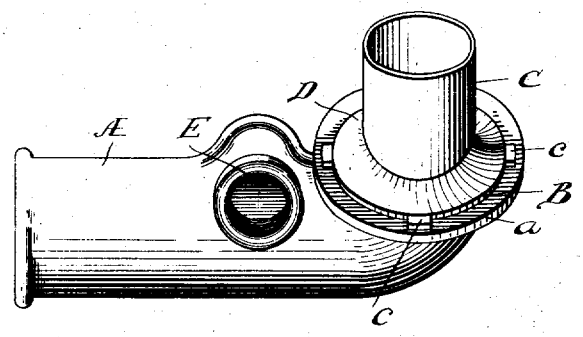

No. 12,688. REISSUED AUG. 27, 1907.

B. OAKES.

WATER CLOSET BEND.

APPLICATION FILED MAY 17, 1907.

2 SHEETS—SHEET 1.

WITNESSES

C. E. Day.

Alice Townsend

INVENTOR

Ben Oakes.

Parker & Burton Attorneys.

No. 12,688. REISSUED AUG. 27, 1907.

B. OAKES.

WATER CLOSET BEND.

APPLICATION FILED MAY 17, 1907.

2 SHEETS—SHEET 2

WITNESSES

C. E. Day.

Alice Townsend.

INVENTOR

Ben Oakes.

By Parker & Burton.

Attorneys.

UNITED STATES PATENT OFFICE

BEN OAKES, OF DETROIT, MICHIGAN.

WATER-CLOSET BEND.

No. 12,688. Specification of Reissued Letters Patent. Reissued Aug. 27, 1907.

Original No. 846,600, dated March 12, 1907, Serial No. 329,665. Application for reissue filed May 17, 1907. Serial No. 374,311.

*To all whom it may concern:*

Be it known that I, BEN OAKES, a citizen of the United States, residing at Detroit, in the county of Wayne and State of Michigan, have invented new and useful Improvements in Water-Closet Bends, of which the following is a specification.

My invention relates to plumbing, and has particular reference to water-closets bends which make the connection with and carry the soil from the closet to the soil-pipe stack, and is so constructed that it provides for the discharge of the waste from the bath-tub, lavatory, sink, or other fixtures into the soil-pipe stack either with a Y or T connection without danger of siphoning, as hereinafter set forth.

A further object of my invention is to provide a water-closet bend constructed in such a manner that it provides for carrying the waste from lavatories, bath-tubs, sinks, and the like into the soil-pipe stack and which bend shall be as substantial and sanitary as possible and at the same time be readily adapted to various circumstances and conditions. Heretofore, these bends have been constructed of lead, two forms being in common use, one the combination iron ferrule and lead bend and the other one having a brass ferrule the same size as the lead bend and connected thereto with a wiped joint. In both of these constructions the waste connections are run into the lead bend and joined thereto with a soldered joint. These forms of construction frequently cause trouble, as the lead bends are liable to crack under the wiped joints and around the bottom of the lead bend, causing a leak. These cracks and leaks may be from several causes, such as the settling of the soil-pipe stack or of the building or by expansion and contraction of the bend, both hot and cold water being discharged into them. The work necessary in making these forms of construction has a tendency to weaken the lead by overheating.

With these and other objects in view my invention consists generally of a combination water-closet bend with flange arranged to receive soil and waste from water-closets, bath-tubs, lavatories, sinks, or other fixtures and to carry said waste direct to the soil-pipe stack with only one calked or screwed joint without danger of siphon action one upon the other, and is also constructed that the floor connection can be screwed in at any time before the floor is laid, thus avoiding danger of injury by plasterers and other workmen before the floor is laid.

My invention further consists in the novel details of construction and in the peculiar arrangement and relative positions of the several parts, all as hereinafter described and particularly pointed out.

My invention will be more readily understood by reference to the drawings hereto attached, in which:—

Figure 2:
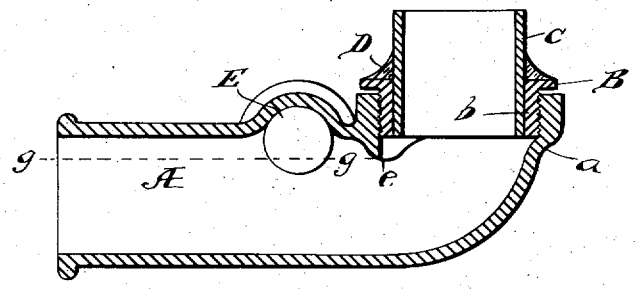
Figure 4:
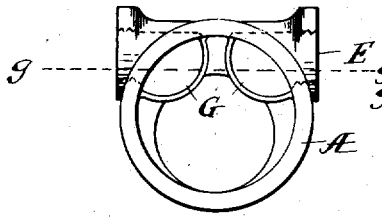
Figure 3:
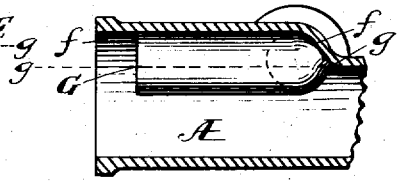
Figure 5:
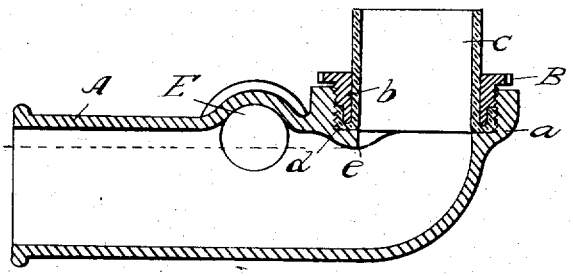
Figure 6:
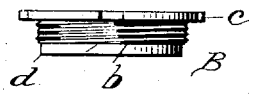
Figure 7:
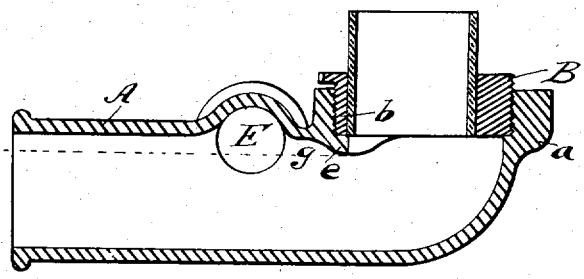

Figure 1 is a view in perspective showing my invention with the parts united. Fig. 2 is a sectional view of Fig. 1. Fig. 3 is a sectional view of the enlarged end of my bend. Fig. 4 is an end view of the enlarged end. Fig. 5 is a sectional view of the bend, showing how the lead pipe is connected without a soldered joint. Fig. 6 shows the form of flange used in Fig. 5. Fig. 7, is a sectional view of Fig. 8, which figure shows the eccentric form of the flange of my bend.

Similar letters refer to similar parts throughout the several views.

A is the water-closet bend and is preferably made of cast-iron of the same general style as to thickness and quality of iron used as ordinary cast-iron soil-pipe. This bend is provided with the waste-opening E, the said opening being threaded to receive the pipe-making connection for waste from other fixtures than the water-closet. It will be noticed that the opening E is made on the top line of the bend, and as the opening of the closet is of less capacity than that of the bend there will always be an air-space at the top thereof, and the connections being made at the top siphoning will thus be prevented. An opening, preferably two inches in diameter, may be provided in the top of the bend for vent of closet wherever such construction is required or desirable. The inlet end of the bend A is constructed with the heavy bead *a*, thus providing for additional strength at this point. This bead *a* is threaded on the inside to receive the brass flange B, which is also threaded. The outlet end of the bend is intended to enter a T or Y in the soil-pipe stack with a calked or screwed connection in the usual manner.

The brass flange B, the construction of which can be varied and used in the form of a collar or thimble, has the threaded extension *b*, as shown in Fig. 2, for the purpose of making a screw-joint connection with the inlet end of the bend, the parts being screwed together with red or white lead to make a tight joint without the use of a washer. To the upper side of the brass flange B is attached the lead pipe C, which may be of any required length to extend far enough above the floor to make the usual opening for the closet. The lead pipe is connected to the flange B by means of the soldered joint D, which may be a wiped or sweated joint or of any approved kind, and, if desirable, can be made at the lower inside end of the flange. The lead pipe C will take care of any slight settlement of the building or soil-pipe stack or expansion and contraction of the parts, as only cold water passes the lead pipe C.

A somewhat less expensive joint can be made, and which at the same time will be substantial and sanitary by the use of an iron flange, such as is shown in Fig. 6. When this is used, the lead pipe C is extended through the flange and then turned over the extension *b* of the flange and up the side thereof, the said extension *b* in this construction being only about one-half threaded, the plain part thereof being somewhat reduced in diameter to form a recess *d*, into which the lead pipe C is fitted. The flange and lead pipe thus arranged are screwed into the bend A until the lead comes in contact with and is screwed tightly against the shoulder *e* at the neck of the bend, which is lowered into the opening, as shown in the drawings, to more effectively provide an air-space at the top of the bend, the sides of the bend being enlarged at this point in order to maintain the full capacity of the bend, as is shown by H in Fig. 8. The lead is caught by the screw-thread of the bend, as is shown in Fig. 5, and with the use of white or red lead a tight permanent joint is assured.

In both forms of construction the flange is provided with the lugs *c* to assist in conveniently screwing the parts tightly together.

Figure 8:
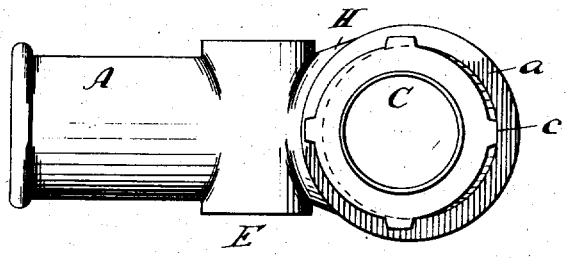

Figs. 7 and 8 show a variation of my invention, which allows of the shifting of the position of the closet-opening. This is accomplished by constructing the flange C with the opening at one side of the center, whereby an eccentric is formed, and increasing the size of the inlet end of the bend to correspond with the increased size of the flange so as to receive the same. The position of the lead pipe can be varied to any desired point within the radius of the eccentric.

The flange B and the lead pipe C can be united with a soldered joint made at the lower end of the extension *b* of the flange whenever such construction would be desirable.

The enlarged end of the bend is shown in Figs. 3 and 4. This construction provides for one or more waste connections other than from the closet and is constructed in such a manner that with one calked joint or screwed connection of the bend with the soil-pipe stack two or more openings for waste are provided for and the waste conducted to the soil-pipe stack without danger of siphon action on the waste connections from the discharge of soil through the bend, as waste connections are run along the top or side of the outlet end of the bend, and by the use of the partitions G each waste-opening has direct and separate communication to the soil-pipe stack at all times. By making the proper and necessary connections with the chambers G this construction can also be used for vent purposes. While I prefer the construction, as shown in the drawings, having the partitions G, still these partitions may be omitted, and the waste allowed to discharge into the bend at the top line before entering the soil-pipe stack and yet be protected from siphon action, as hereinbefore set forth. While in the drawings I have only shown the construction last described with an enlarged end, I wish it understood that the same general arrangement and construction may be used with a bend having the outlet end contracted but allowing sufficient capacity in the bend to take care of the waste from the closet.

The lower edge of the flange *e* determines roughly the level of the water in the bend A. Thus the level will be roughly as indicated by the dotted lines *g*, *g*, leaving above the fluid in the bend an air space with which the opening E communicates, and into which air may pass from the delivery end of the bend, so that a siphoning action cannot take place in the auxiliary waste-inlets. Obviously the effect will be the same in the construction of Figs. 3 and 4, the same air space is secured reaching to the delivery end of the bend.

The bend can also be made with the T connection of the soil-pipe stack and the bend cast together in one piece, with a vent-opening in the top and near the outlet end of the bend. By reducing the length of the outlet end of the bend and providing it with standard screw-threads and other slight changes my improved bend can readily be adapted to be used in what is known among plumbers as the "Durham" system.

I wish it understood that any or all of the inlet connections into the bend can be made by use of a hub to receive a ferrule and calked joint in the place of screw connections, as herein shown and described.

Modifications of the minor details of my improved soil-pipe bend will doubtless readily suggest themselves to those skilled in the art to which it appertains, and I therefore do not desire to limit myself to the exact details of construction herein shown and described.

Having thus described my invention, what I claim is:—

1. A water-closet bend, its inlet screw-threaded to receive a flange, the flange having an opening eccentric to the threaded portion to receive a pipe connection leading to a closet, the construction being such that a slight lateral adjustment of the pipe with reference to the closet and bend may be effected by rotating said flange, substantially as described.

2. A pipe connection comprising an elbow having an enlarged inlet end, waste-openings near the inlet end above the general axis of the elbow, and deflecting-partitions in the elbow continuous with the waste-openings.

3. A water-closet bend having auxiliary waste-inlets, and guiding partitions on the inner walls of the bend continuous to the openings therein.

4. A water-closet bend having auxiliary waste-inlets above the center thereof, and guiding-partitions in the upper portion of the inner walls of the bend continuous to the inlets.

5. A water-closet bend having a threaded inlet, a flange fitting in said threaded inlet, said flange having an eccentric opening to receive a pipe connection and provided with means for rotating the same.

6. A water-closet-bend having an inlet, said bend being so constructed that the upper part of its bore, from the delivery end of said bend toward the inlet pipe, shall be above the delivery end of said inlet, and an inlet communicating with said upper part of said bore, for the purpose described.

7. A water-closet bend having an inlet provided with a flange *e* which carries the delivery end of the inlet below the upper part of the bore of the bend, and an inlet communicating with said upper part of the bore, substantially as and for the purpose described.

8. A water-closet-bend having an inlet, said bend being so constructed that the upper part of its bore shall be above the delivery end of said inlet, an inlet communicating with said upper part of said bore, and means for placing said upper part of said bore into communication with the outer air, for the purpose described.

In testimony whereof, I sign this specification in the presence of two witnesses.

BEN OAKES.

Witnesses:
ALICE TOWNSEND,
ELLIOTT J. STODDARD.